US012244527B2

(12) United States Patent
Takeda et al.

(10) Patent No.: US 12,244,527 B2
(45) Date of Patent: Mar. 4, 2025

(54) USER TERMINAL AND RADIO COMMUNICATION METHOD

(71) Applicant: NTT DOCOMO, INC., Tokyo (JP)

(72) Inventors: Kazuaki Takeda, Tokyo (JP); Satoshi Nagata, Tokyo (JP); Chongning Na, Beijing (CN); Yuichi Kakishima, Palo Alto, CA (US)

(73) Assignee: NTT DOCOMO, INC., Tokyo (JP)

(*) Notice: Subject to any disclaimer, the term of this patent is extended or adjusted under 35 U.S.C. 154(b) by 1069 days.

(21) Appl. No.: 16/483,136

(22) PCT Filed: Feb. 2, 2018

(86) PCT No.: PCT/JP2018/003542
§ 371 (c)(1),
(2) Date: Aug. 2, 2019

(87) PCT Pub. No.: WO2018/143391
PCT Pub. Date: Aug. 9, 2018

(65) Prior Publication Data
US 2020/0244413 A1 Jul. 30, 2020

(30) Foreign Application Priority Data
Feb. 3, 2017 (JP) .................. 2017-018950

(51) Int. Cl.
H04L 5/00 (2006.01)
H04B 7/06 (2006.01)
(Continued)

(52) U.S. Cl.
CPC ......... *H04L 5/0048* (2013.01); *H04B 7/0695* (2013.01); *H04W 16/28* (2013.01);
(Continued)

(58) Field of Classification Search
CPC ....... H04L 5/0048; H04B 7/0695; H04B 7/10; H04W 16/28; H04W 24/10;
(Continued)

(56) References Cited

U.S. PATENT DOCUMENTS 9,900,891 B1\* 2/2018 Islam .................... H04W 72/23
2014/0226614 A1 8/2014 Kato et al.
(Continued)

FOREIGN PATENT DOCUMENTS

JP 2013-074447 A 4/2013
WO 2016-017373 A1 2/2016
(Continued)

OTHER PUBLICATIONS

Pan et al., WTRU Initiated Beam Recovery, U.S. Appl. No. 62/443,382, filed Jan. 6, 2017, USPTO, whole document (Year: 2017).\*
(Continued)

*Primary Examiner* — Michael Thier
*Assistant Examiner* — Jose L Perez
(74) *Attorney, Agent, or Firm* — Osha Bergman Watanabe & Burton LLP

(57) ABSTRACT

The present invention is designed to enable quick beam recovery. A user terminal according to the present invention has a receiving section that receives a downlink (DL) signal, and a control section that controls a beam that is used to transmit and/or receive the DL signal, and the control section controls transmission of an uplink (UL) signal that requests switching of the beam, based on the received power and/or the received quality of a plurality of mobility measurement signals that are respectively associated with a plurality of beams.

7 Claims, 12 Drawing Sheets

(51) Int. Cl.
| | |
|---|---|
| *H04W 16/28* | (2009.01) |
| *H04W 24/10* | (2009.01) |
| *H04W 36/08* | (2009.01) |
| *H04W 72/23* | (2023.01) |
| *H04W 74/00* | (2009.01) |
| *H04W 74/0833* | (2024.01) |

(52) U.S. Cl.
CPC ......... *H04W 24/10* (2013.01); *H04W 36/085* (2023.05); *H04W 72/23* (2023.01); *H04W 74/004* (2013.01); *H04W 74/0833* (2013.01)

(58) Field of Classification Search
CPC ............. H04W 72/042; H04W 74/004; H04W 74/0833; H04W 72/23; H04W 36/08; H04W 36/06; H04W 36/085; H04W 74/0836; H04W 74/0838
See application file for complete search history.

(56) References Cited

U.S. PATENT DOCUMENTS

| | | | |
|---|---|---|---|
| 2016/0353510 A1 | 12/2016 | Zhang et al. | |
| 2017/0195998 A1 | 7/2017 | Zhang et al. | |
| 2017/0223757 A1 | 8/2017 | Tsuboi et al. | |
| 2017/0251460 A1* | 8/2017 | Agiwal | H04W 72/20 |
| 2017/0331670 A1* | 11/2017 | Parkvall | H04B 7/0695 |
| 2018/0138962 A1* | 5/2018 | Islam | H04B 7/0695 |
| 2018/0192384 A1* | 7/2018 | Chou | H04W 76/27 |
| 2018/0205585 A1* | 7/2018 | Sadiq | H04L 5/0048 |
| 2019/0208547 A1* | 7/2019 | Koskela | H04W 24/10 |
| 2019/0349960 A1* | 11/2019 | Li | H04L 27/26136 |
| 2019/0350028 A1* | 11/2019 | Kaasalainen | H04B 7/0617 |
| 2019/0356438 A1* | 11/2019 | Lee | H04B 7/0695 |
| 2019/0356439 A1* | 11/2019 | Lee | H04W 74/0833 |
| 2019/0387441 A1* | 12/2019 | Koskela | H04W 36/0077 |
| 2020/0037385 A1* | 1/2020 | Park | H04W 76/27 |
| 2020/0059398 A1* | 2/2020 | Pan | H04W 56/001 |
| 2020/0280359 A1* | 9/2020 | Jung | H04W 74/006 |
| 2020/0404617 A1* | 12/2020 | Murray | H04W 68/02 |
| 2021/0084640 A1* | 3/2021 | Kang | H04B 7/00 |
| 2021/0136768 A1* | 5/2021 | Kang | H04L 5/0023 |
| 2021/0359900 A1* | 11/2021 | Pan | H04W 72/0413 |

FOREIGN PATENT DOCUMENTS

| | | | | |
|---|---|---|---|---|
| WO | 2016/044994 A1 | 3/2016 | | |
| WO | WO-2018118409 A1 * | 6/2018 | ............... | H04B 7/04 |
| WO | WO-2018136300 A1 * | 7/2018 | ........... | H04B 7/0408 |

OTHER PUBLICATIONS

Li et al., Mechanisms for Efficient Access and Transmission in NR, U.S. Appl. No. 62/443,497, Jan. 6, 2017, USPTO, whole document (Year: 2017).*
Tsai et al., Mechanisms for Efficient Physical Channel and Beam Management Design in New Radio, U.S. Appl. No. 62/453,855, filed Feb. 2, 2017, USPTO, whole document (Year: 2017).*
Islam et al., Fallback Beam Selection Procedure During Failure of Beam Change Instruction Reception, U.S. Appl. No. 62/436,966, filed Dec. 20, 2016, USPTO, whole document (Year: 2016).*
Koskela et al., Random Access Preamble Selection (U.S. Appl. No. 62/323,081), Apr. 15, 2016, USPTO, whole document (Year: 2016).*
Office Action issued in Australian Application No. 2018215305 mailed on Sep. 16, 2021 (4 pages).
3GPP TS 36.300 V8.12.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended European Search Report in counterpart European Application No. 18747844.1 issued on Aug. 27, 2020 (11 pages).
Nokia et al; "Beam Recovery in NR"; 3GPP TSG RAN WG1 NR Ad-Hoc Meeting, R1-1701092; Spokane, USA; Jan. 16-20, 2017 (5 pages).
CMCC; "Discussion on UE triggered beam reporting for beam recovery"; 3GPP TSG RAN WG1 NR Ad-Hoc Meeting, R1-1700436; Spokane, USA; Jan. 16-20, 2017 (5 pages).
NTT Docomo, Inc.; "Further views on mechanism to recover from beam failure"; 3GPP TSG RAN1 WG1 #90, R1-1713919; Prague, Czechia; Aug. 21-25, 2017 (6 pages).
Office Action issued in the counterpart European Patent Application No. 18747844.1, mailed on Jun. 7, 2021 (7 pages).
Office Action issued in the counterpart Japanese Patent Application No. 2018-566109, mailed on May 10, 2022 (8 pages).
Office Action issued in Indian Application No. 201937034366 mailed on Jan. 4, 2022 (8 pages).
International Search Report issued in PCT/JP2018/003542 mailed on Apr. 24, 2018 (2 pages).
Written Opinion of the International Searching Authority issued in PCT/JP2018/003542 mailed on Apr. 24, 2018 (4 pages).
Huawei, HiSilicon; "Discussion on downlink beam measurement and UE reporting procedure"; 3GPP TSG RAN WG1 NR Ad hoc Meeting, R1-1700039; Spokane, USA; Jan. 16-20, 2017 (10 pages).
Office Action issued in the counterpart Chinese Patent Application No. 201880020358.7, mailed on Jul. 20, 2022 (13 pages).
Samsung; "Discussion on UE initiated Beam Switching"; 3GPP TSG RAN WG1 Meeting #87, R1-1700923; Spokane, USA; Jan. 16-20, 2017 (2 pages).

* cited by examiner

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "NR (New Radio)," "NX (New radio access)," "New RAT (Radio Access Technology)," "FX (Future generation radio access)," "LTE Rel. 13," "LTE Rel. 14," "LTE Rel. 15" or later versions) are under study.

In LTE Rel. 10/11, carrier aggregation (CA) to integrate multiple component carriers (CC) is introduced in order to achieve broadbandization. Each CC is configured with the system bandwidth of LTE Rel. 8 as one unit. In addition, in CA, multiple CCs under the same radio base station (eNB: eNodeB) are configured in a user terminal (UE: User Equipment).

Meanwhile, in LTE Rel. 12, dual connectivity (DC), in which multiple cell groups (CGs) formed by different radio base stations are configured in a UE, is also introduced. Each cell group is comprised of at least one cell (CC). Since multiple CCs of different radio base stations are aggregated in DC, DC is also referred to as "inter-base station CA (inter-eNB CA)."

In existing LTE systems (for example, LTE Rel. 8 to 13), a user terminal receives downlink control information (DCI) via a downlink control channel (for example, PDCCH: Physical Downlink Control Channel, EPDCCH: Enhanced Physical Downlink Control Channel, MPDCCH: Machine type communication (MTC) Physical Downlink Control Channel, etc.). The user terminal receives DL data channels (for example, PDSCH: Physical Downlink Shared Channel) and/or transmits UL data channels (for example, PUSCH: Physical Uplink Shared Channel) based on the DCI.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, 5G, NR, etc.), research is being made to use frequency bands (for example, 3 to 40 GHz) higher than existing frequency bands in order to achieve high speeds and large capacity (for example, eMBB (enhanced Mobile Broad Band)). In general, distance-induced attenuation increases as the frequency band increases, and this makes it difficult to ensure coverage. Therefore, MIMO (also referred to as "Multiple Input Multiple Output," "massive MIMO," and so on) using a large number of antenna elements is under study.

In MIMO, in which a large number of antenna elements are used, it is possible to form beams (antenna directivities) by controlling the amplitude and/or the phase of signals to be transmitted or received via each antenna element (beam forming (BF)). For example, when antenna elements are arranged two-dimensionally, the higher the frequency, the greater the number of antenna elements that can be arranged in a predetermined area (the number of antenna elements) increases. As the number of antenna elements per given area increases, the beam width narrows (becomes narrower), and the beam forming gain increases. Therefore, when beam forming is adopted, propagation loss (path loss) can be reduced and coverage can be ensured even in high frequency bands.

Meanwhile, when using beam forming (for example, when it is assumed that a narrower beam is used in a high frequency band), blockage caused by obstacles and/or the like might cause a deterioration of beams and link disconnections (beam failures), providing a factor of a deterioration of system performance. Therefore, the issue is how to recover (regain, switch, etc.) beams quickly.

The present invention has been made in view of the above, and it is therefore an object of the present invention to provide a user terminal and a radio communication method, whereby beams can be recovered quickly.

Solution to Problem

According to one aspect of the present invention, a user terminal has a receiving section that receives a downlink (DL) signal, and a control section that controls a beam that is used to transmit and/or receive the DL signal, and, in this user terminal, the control section controls transmission of an uplink (UL) signal that requests switching of the beam, based on the received power and/or the received quality of a plurality of mobility measurement signals that are respectively associated with a plurality of beams.

Advantageous Effects of Invention

According to the present invention, beams can be recovered quickly.

DESCRIPTION OF EMBODIMENTS

Future radio communication systems (for example, 5G, NR, etc.) presume use cases characterized by, for example, high speed and large capacity (for example, eMBB), a very large number of terminals (for example, massive MTC (Machine Type Communication)), ultra-high reliability and low latency (for example, URLLC (Ultra Reliable and Low-Latency Communications), and so on. Assuming these use cases, for example, studies are in progress to communicate using beam forming (BF) in future radio communication systems.

The beam forming (BF) includes a digital BF and an analog beam BF. Digital BF refers to a method of performing precoding signal processing on the baseband (for digital signals). In this case, inverse fast Fourier transform (IFFT)/digital-to-analog conversion (DAC)/RF (Radio Frequency) need to be carried out in parallel processes, as many as the number of antenna ports (RF Chains). Meanwhile, it is possible to form a number of beams according to the number of RF chains at an arbitrary timing.

Analog BF refers to a method of using phase shifting devices on RF. In this case, since it is only necessary to rotate the phase of RF signals, analog BF can be realized with simple and inexpensive configurations, but it is nevertheless not possible to form a plurality of beams at the same time. To be more specific, when analog BF is used, each phase shifting device can only form one beam at a time.

Thus, if a radio base station (referred to as, for example, "gNB (gNodeB)," "transmission and reception point (TRP)," "eNB (eNode B)," "base station (BS)," and so on) has only one phase shifter, the radio base station can only form one beam at any given time. Therefore, when multiple beams are transmitted using analog BF alone, these beams cannot be transmitted simultaneously using the same resources, and the beams need to be switched, rotated and so on, over time.

Note that it is also possible to adopt a hybrid BF configuration which combines digital BF and analog BF. Although, for future radio communication systems (for example, 5G, NR, etc.), a study is under way to introduce MIMO (for example, massive MIMO), which uses a large number of antenna elements, attempting to form an enormous number of beams using digital BF alone might lead to expensive circuit structures. For this reason, there is a possibility that hybrid BF will be used in future radio communication systems.

When using BF (including digital BF, analog BF and hybrid BF) such as described above (for example, when it is assumed that a narrower beam is used in a high frequency band), interference by obstacles may cause beam degradation and link interruption, which may provide a factor of deterioration in system performance. Therefore, there is a plan to introduce beam management in order to ensure the robustness of beams. Beam management may consist of one or more phases (for example, P1, P2, P3, etc.). The one or more phases may be determined depending on the type of the beam to be managed.

Figure 1A:
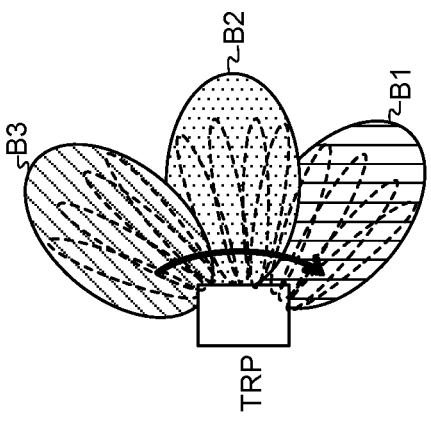
FIGS. 1A and 1B are conceptual diagrams to show examples of beam management.
Figure 1B:
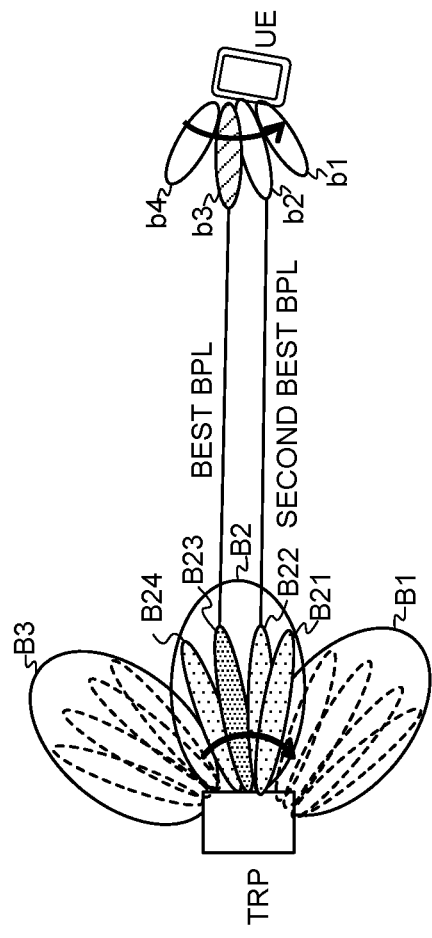
Figure 2A:
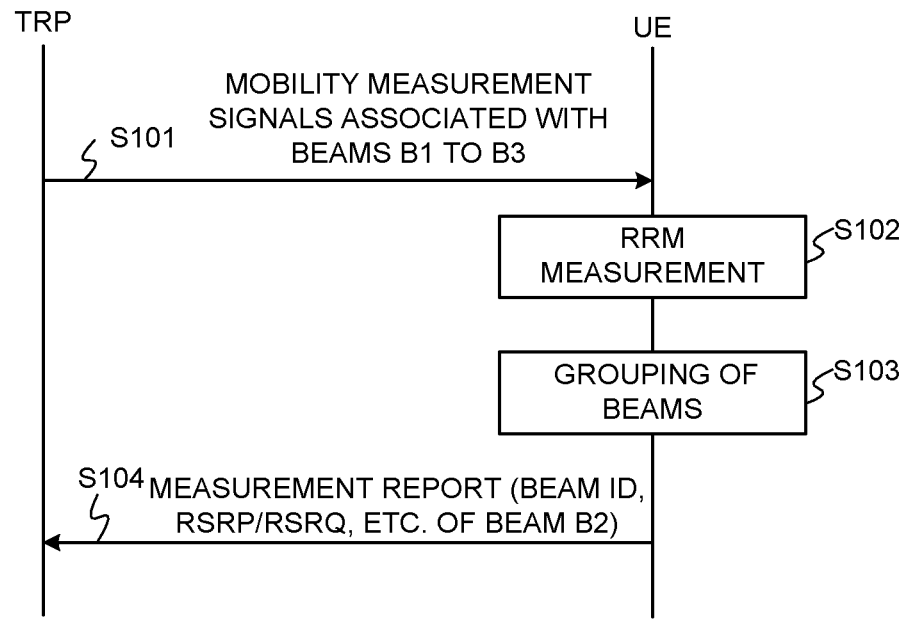
FIGS. 2A and 2B are sequence diagrams to show examples of beam management.

With reference to FIG. 1 and FIG. 2, beam management in future radio communication system will be explained. FIG. 1A and FIG. 2A show examples of beam management in phase P1. Phase P1 may, for example, manage beams (rough beams having relatively wide beam widths) that are used for signals for mobility measurements (RRM (Radio Resource Management) measurements) (mobility measurement signals). Also, since one or more beams having relatively narrow beam widths (also referred to as "finer beams," "narrower beams," etc.) can be arranged inside a rough beam, a rough beam may be referred to as a "beam group."

Here, the mobility measurement signals are also referred to as "synchronization signal (SS) blocks," "mobility reference signals (MRSs)," "channel state information reference signals (CSI-RSs)," "beam-specific signals," "cell-specific signals" and so on. An SS block is a signal group including at least one of a primary synchronization signal (PSS), a secondary synchronization signal (SSS) and a broadcast channel (PBCH: Physical Broadcast Channel). In this way, the mobility measurement signals may be at least one of the PSS, the SSS, the PBCH, the MRS and the CSI-RS, or may be signals that are formed by extending and/or changing at least one of the PSS, the SSS, the PBCH, the MRS and the CSI-RS (for example, a signal that is formed by changing the density and/or the cycle of at least one of these signals).

Note that, in phase P1, a user terminal may be in either RRC connected state or idle state, and has only to be in a state in which the user terminal can recognize the configurations of mobility measurement signals. Furthermore, phase P1 may include initial access operations, or may include only operations after completion of initial access. Also, in phase P1, the user terminal does not have to form Rx beams (receiving beams).

In FIG. 1A, a radio base station (TRP) transmits mobility measurement signals (also referred to as "SS blocks," "MRSs" or "CSI-RSs," etc.), which are associated with beams B1 to B3 (step S101 of FIG. 2A). In FIG. 1A, analog BF is employed, so that the mobility measurement signals associated with beams B1 to B3 are all transmitted (beam sweep) at different times (for example, in different symbols and/or slots etc.). When digital BF is applied the MRSs associated with beams B1 to B3 may be transmitted at the same time.

The user terminal (UE) performs RRM measurements using the mobility measurement signals associated with beams B1 to B3 (step S102 in FIG. 2A). To be more specific, the user terminal measures the received power (for example, RSRP: Reference Signal Received Power) and/or the received quality (for example, RSRQ: Reference Signal Received Quality) (hereinafter abbreviated as "RSRP/RSRQ") of the mobility measurement signals. Also, in the present specification, "RSRP/RSRQ" may be replaced with at least one of the received power (RSRP), the received quality (RSRQ), the received strength (for example, RSSI: Reference Signal Strength Indicator) and the signal-to-noise ratio (SNR: Signal-to-Noise Ratio) of DL signals (for example, mobility measurement signals) (RSRP/RSRQ/RSSI/SNR).

Also, the user terminal may select (group) beams (beam group) based on the measured RSRP/RSRQ (step S103 of FIG. 2A). For example, in FIG. 1A, the user terminal may classify beam B2 as an active beam and classify beams B1 and B3 as inactive beams (backup beams). Here, an active beam may refer to a beam that can be used for a DL control channel (hereinafter also referred to as "NR-PDCCH") and/or a DL data channel (hereinafter also referred to as "PDSCH"), and an inactive beam may refer to a beam (candidate beam) that is not an active beam. A set of one or more active beams may be referred to as an "active beam set" and so on, and a set of one or more inactive beams may be referred to as a "inactive beam set" and so on.

The user terminal transmits a measurement report (MR), which includes the indicators of one or more beams (also referred to as "beam IDs," "beam indices (BIs)," etc.) and/or the RSRPs/RSRQs of these one or more beams (step S104 of FIG. 2A). In places of beam IDs, the mobility measurement signals' resources, antenna ports and so on may be reported. For example, in step S104 of FIG. 1A and FIG. 2A, the user terminal transmits a measurement report that includes the BI and/or the RSRP/RSRQ of beam B2, which shows the best RSRP/RSRQ. This measurement report is transmitted when a predetermined trigger is fulfilled.

Figure 2B:
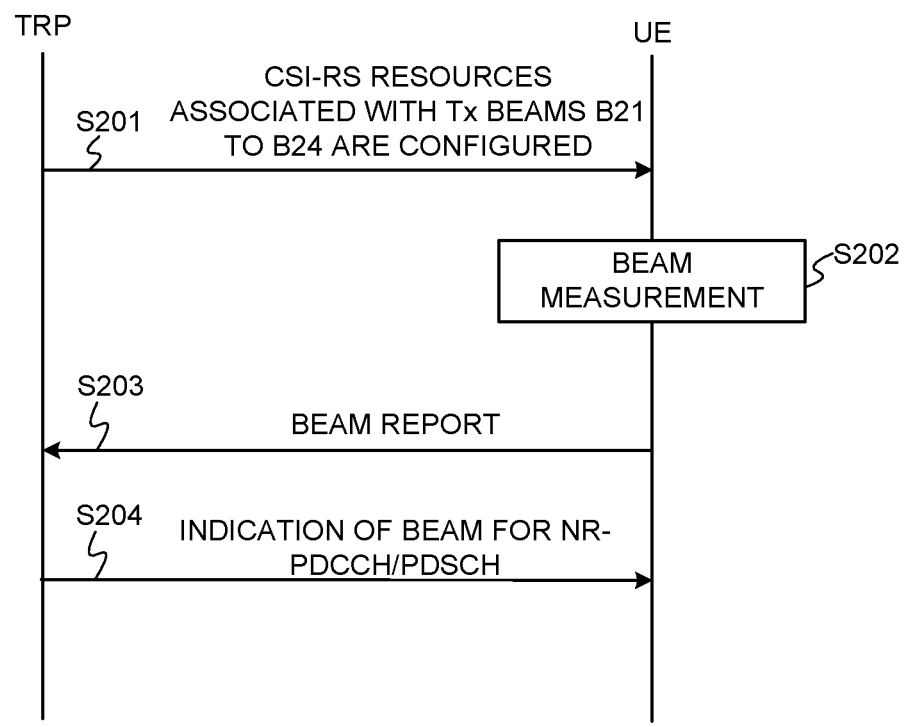

FIG. 1B and FIG. 2B show examples of beam management in phases P2 and/or P 3 (P2/P3). Phase P2 may, for example, manage beams (also referred to as "Tx beams," "transmitting beams," etc.) that are used to transmit the NR-PDCCH and/or the PDSCH (hereinafter also referred to as "NR-PDCCH/PDSCH") in the radio base station. These beams may be finer beams having narrower beam widths than rough beams. Phase P3 may also manage, for example, beams that are used to receive the NR-PDCCH and/or the PDSCH (also referred to as "Rx beams," "receiving beams," etc.) in the user terminal.

The beam management of phase P2/P3 in FIG. 1B and FIG. 2B presumes that the radio base station received a measurement report including the beam ID and/or the RSRP/RSRQ of beam B2, from the user terminal, in the above-described beam management of phase P1.

In FIG. 1B, the radio base station (TRP) transmits configuration information pertaining to K CSI-RS resources #1 to #4, which are associated with K (here, K=4) Tx beams B21 to B24, to the user terminal (step 201 in FIG. 2B).

A CSI-RS resource refers to a CSI-RS-related resource (for example, at least one of a non-zero-power (NZP-) CSI-RS resource and a zero-power (ZP-) CSI-RS resource for interference measurement (IM)). One or more CSI-RS resources may be configured in one CSI process, and each CSI-RS resource may be comprised of one or more antenna ports. In this specification, a CSI-RS resource can be replaced with the CSI-RS (including NZP-CSI-RS, ZP-CSI-RS) that is transmitted using this CSI-RS resource.

The user terminal (UE) measures CSI-RS resources #1 to #4 that are configured (also referred to as "beam measurements," "CSI measurements," etc.) (step S202 of FIG. 2B). To be more specific, the user terminal measures K CSI-RS resources, which are associated with K (here, K=4) Tx beams B21 to B24, respectively, and generates channel state information (CSI) based on the measurement results.

Here, the CSI may include at least one of a channel quality indicator (CQI), a precoding matrix indicator (PMI), a rank indicator (RI), and a CSI-RS resource indicator (CRI). As mentioned earlier, Tx beams are associated with CSI-RS resources, so that it is possible to say that the CRI specifies a Tx beam. Also, while the CRI is an indicator (ID) of a CSI-RS resource (or a Tx beam), the CQI, the PMI and the RI are pieces of information that show channel states (quantity) pertaining to this CSI resource (or Tx beam). Therefore, at least one of the CQI, the PMI and the RI can be used as CSI, and the ID of this CSI can be defined as the CRI.

Based on the measurement results of K Tx beams (K CSI-RS resources corresponding to the K Tx beams), the user terminal selects N (K N) Tx beams. Here, the number of Tx beams, N, may be determined in advance, configured by higher layer signaling, or specified by physical layer signaling.

The user terminal may select Rx beams that are suitable for each selected Tx beam, and select beam pair links (BPLs). Here, a BPL refers to an optimal combination of a Tx beam and an Rx beam. For example, in FIG. 1B, the combination of Tx beam B23 and Rx beam b3 is selected as the best BPL, and the combination of Tx beam B22 and Rx beam b2 is selected as the second best BPL.

The user terminal performs beam reporting based on the results of beam measurements (step S203 of FIG. 2B). To be more specific, the user terminal transmits N CRIs, which correspond to the N Tx beams that have been selected, and at least one of the CQIs, RIs and PMIs of the N Tx beams specified by the N CRIs, to the radio base station. Also, the user terminal may transmit the IDs of Rx beams (also referred to as "Rx beam IDs," "BIs," "beam IDs," etc.) corresponding to the N Tx beams.

The radio base station selects a beam to use for the NR-PDCCH and/or the PDSCH (NR-PDCCH/PDSCH), and indicates this beam to the user terminal (step S204 of FIG. 2B). To be more specific, the radio base station may select a Tx beam to use for the NR-PDCCH and/or the PDSCH (NR-PDCCH/PDSCH) based on N CSIs from the user terminal (for example, N CRIs, at least one of the CQIs, RIs and PMIs of the Tx beams indicated by these N CRIs, and so on). Also, the radio base station may select a BPL based on the Rx beam ID of an Rx beam corresponding to this Tx beam.

Figure 3:
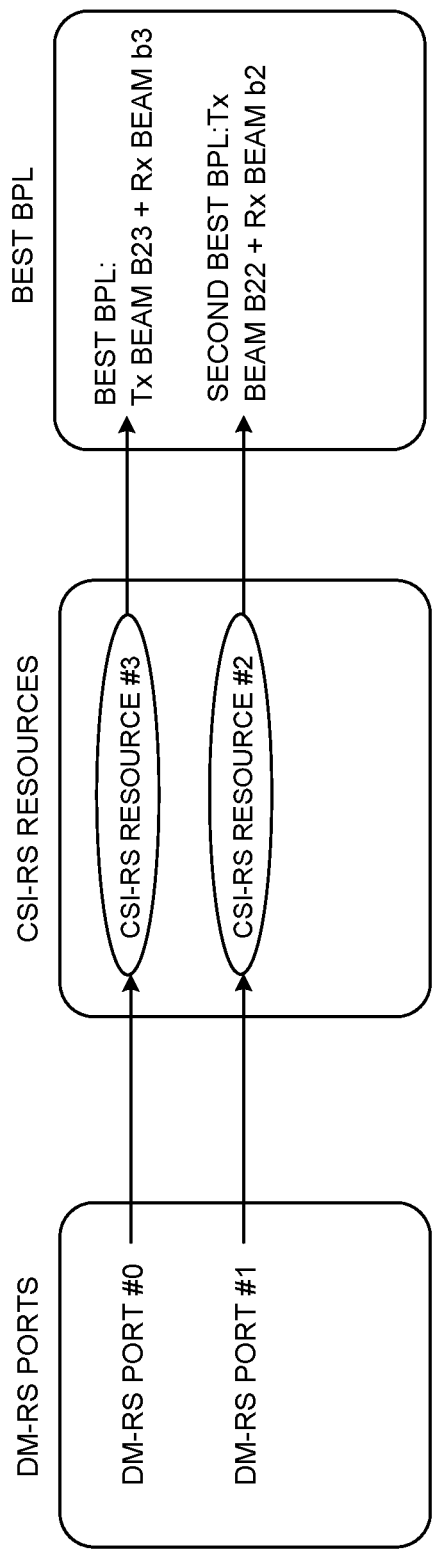
FIG. 3 is a diagram to show examples of associations between DMRS ports and CSI-RS resources.

Also, in step S204, the beam may be indicated based on associations (QCL: Quasi-Co-Location) between the antenna ports (DMRS ports) of the demodulation reference signals (DMRSs) for the NR-PDCCH/PDSCH, and CSI-RS resources. FIG. 3 is a diagram to show examples of associations between DMRS ports and CSI-RS resources. For example, in FIG. 3, CSI-RS resources #3 and #2 are associated with DMRS ports #0 and #1, respectively.

Such associations between DMRS ports and CSI-RS resources may be determined based on CSI from the user terminal. Also, information to represent associations between DMRS ports and CSI-RS resources may be reported from the radio base station to the user terminal via higher layer signaling and/or physical layer signaling (for example, DCI).

For example, in FIG. 3, the radio base station transmits an NR-PDCCH/PDSCH, using Tx beam B23, at DMRS port #0, which is associated with CSI-RS resource #3 that is specified by the CRI of the best BPL in FIG. 1B. The user terminal demodulates the NR-PDCCH/PDSCH on the assumption that, at DMRS port #0, the NR-PDCCH is transmitted using Tx beam B23, where the measurement result of CSI-RS resource #3 is the best. Furthermore the user terminal may demodulate the NR-PDCCH/PDSCH using Rx beam b3 corresponding to this Tx beam B23.

As described above, in future radio communication systems, beams are selected based on CSI from the user terminals and applied to the NR-PDCCH/PDSCH. However, BPLs may be degraded or disconnected (that is, beam failures might occur) due to blockage caused by obstacles. Consequently, it is important to recover quickly from beam failures.

So, the present inventors have come up with the idea of recovering quickly from beam failures by sending user terminal-initiated beam failure reports to the radio base station, and thereupon arrived at the present invention.

Now, embodiments of the present invention will be described below in detail with reference to the accompanying drawings. Note that although the beam forming in the following present embodiment assumes digital BF, analog BF and hybrid BF can be applied as appropriate.

Also, "beams" according to the present embodiment may include beams that are used to transmit DL signals from radio base stations (also referred to as "transmitting beams," "Tx beams," and so on) and/or beams that are used to receive DL signals at user terminals (also referred to as "receiving beams," "Rx beams," and so on). Combinations of Tx beams and Rx beams may be referred to as "beam pair links (BPLs)" and/or the like.

(Report Trigger)

Figure 4:
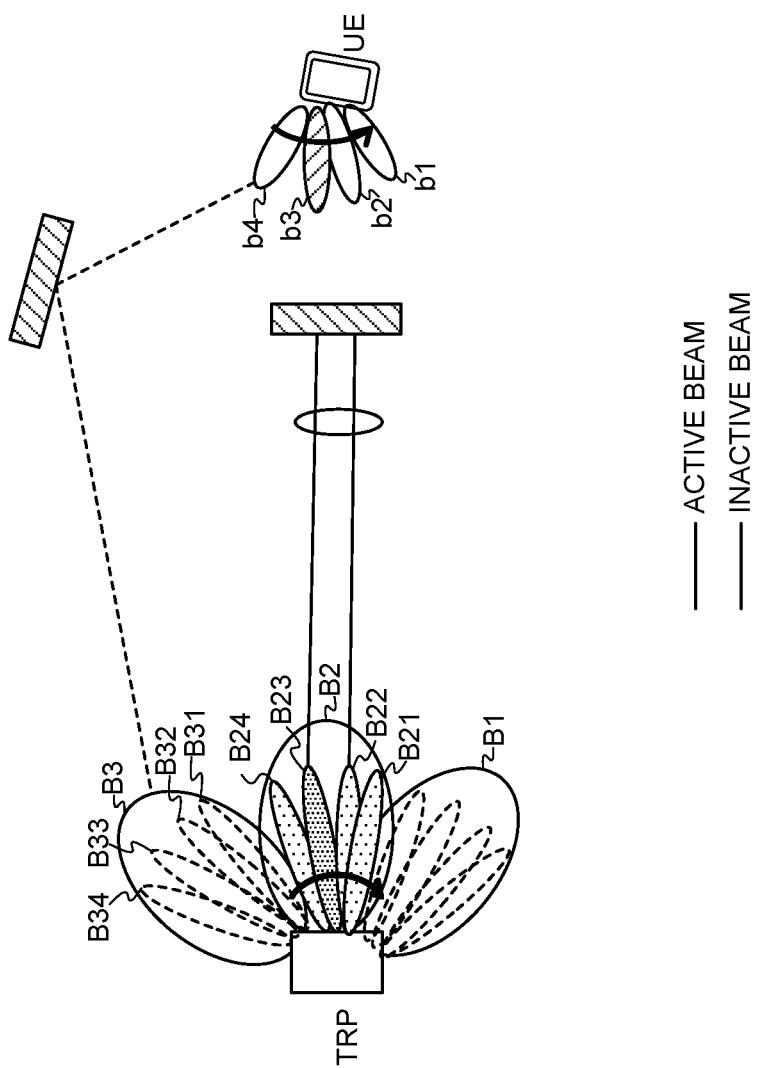
FIG. 4 is a diagram to show an example of beam failure according to the present embodiment.

FIG. 4 is a diagram to show an example of beam failure according to the present embodiment. Assume that, in FIG. 4, beams B23 and B22 are beams (active beams) for use for the NR-PDCCH/PDSCH and CSI-RS resources. Furthermore, beam B3 is a beam (inactive beam) that a user terminal can recognize (visible) using a mobility measurement signal (also referred to as an "SS block," "MRS" or "CSI-RS," etc.).

As shown in FIG. 4, when active beams B22 and B23 deteriorate due to blockage caused by an obstacle the problem is in response to what trigger (on what conditions) the user terminal (UE) reports beam failure to the radio base station (TRP). This is because, even if the present active beams are still available for use, if the user terminal frequently transmits UL signals for reporting beam failures, the transmission of these UL signals may be a waste. Meanwhile, there is a fear that, if the transmission of these UL signals is delayed, beam recovery will be delayed.

Therefore, the user terminal may control transmission of a UL signal (hereinafter referred to as "recovery signal") that serves to report beam failures (or to request beam recovery) based on the RSRP and/or the RSRP (RSRP/RSRQ) of a mobility measurement signal (which, for example, may be an SS block, an MRS or a CSI-RS).

The user terminal periodically measures active beams (active beam set) and inactive beams (inactive beam set) using mobility measurement signals. The user terminal controls transmission of recovery signals based on results of comparing the RSRP/RSRQ of mobility measurement signals associated with active beams (active beam set) with the RSRP/RSRQ of mobility measurement signals associated with inactive beams (inactive beam set).

To be more specific, if the RSRP/RSRQ of a mobility measurement signal associated with an active beam (active beam set) is lower than the RSRP/RSRQ of a mobility measurement signal associated with an inactive beam (inactive beam set), the user terminal may transmit a recovery signal.

For example, in FIG. 4, if the RSRP/RSRQ of the mobility measurement signal associated with the active beam set including beams B22 and B23 is lower than the RSRP/RSRQ of the mobility measurement signal associated with the inactive beam set including beam B3, the user terminal may transmit a recovery signal.

(Recovery Signal)

Next, the recovery signal that is transmitted in response to report triggers as described above will be described.

The recovery signal can be any signal as long as it is a UL signal that serves to report beam failures (or to request beam recovery). For example, any one of (1) a physical random access channel (PRACH: Physical Random Access Channel) preamble (also referred to as "RACH preamble"), (2) a UL scheduling request (SR), and (3) a UL signal that is transmitted without DCI (UL grant) (UL grant-free UL signal) from the radio base station can be used as a recovery signal.

This recovery signal may include the beam ID of a newly selected beam (or the resource (or the antenna port) of a mobility measurement signal associated with this beam), or this beam ID may be reported implicitly. Furthermore, the recovery signal may include the RSRP/RSRQ of this newly selected beam.

When the beam ID is reported implicitly, the UL resource for the recovery signal may be associated with the mobility measurement signal (or with this mobility measurement signal's resource or antenna port). Information representing this association may be reported from the radio base station to the user terminal using at least one of broadcast information (for example, the broadcast channel at the time of initial access), higher layer signaling and physical layer signaling.

Using the UL resource associated with the mobility measurement signal, the user terminal transmits the recovery signal, and reports the beam ID in an implicit manner. The radio base station can identify the new beam from the mobility measurement signal associated with the UL resource in which the recovery signal was transmitted.

For example, (1) when a PRACH preamble is used as a recovery signal, the PRACH resource for the PRACH preamble may be associated with the mobility measurement signal (or with this mobility measurement signal's resource or antenna port). For example, in FIG. 4, the user terminal transmits the PRACH preamble using the PRACH resource associated with the mobility measurement signal of inactive beam B3. The radio base station may identify beam B3 from the mobility measurement signal associated with the PRACH resource.

Also, (2) when an SR is used as a recovery signal, it is necessary to identify whether this SR is used to request scheduling of a normal UL signal, or to report beam failure (or to request beam recovery). Therefore, this SR may be modulated using BPSK (Binary Phase-Shift Keying) or QPSK (Quadrature Phase-Shift Keying), in which one symbol can communicate one bit or two bits.

For example, when an SR is one bit, the bit value "0" may represent a beam failure report (or a beam recovery request), and the bit value "1" may represent a UL signal scheduling request. Also, when an SR is two bits, a mobility measurement signal (or this mobility measurement signal's resource or antenna port) may be associated with the bit value to represent a beam failure report (or a beam recovery request). In FIG. 4, the user terminal transmits an SR having the bit value associated with the mobility measurement signal for inactive beam B3. The radio base station may identify beam B3 from the mobility measurement signal associated with this bit value.

Also, (3) when a UL grant-free UL signal is used as a recovery signal, the resource for the UL grant-free signal may be associated with a mobility measurement signal (or this mobility measurement signal's resource or antenna port). For example, in FIG. 4, the user terminal transmits a UL signal without a UL grant, by using a UL resource that is associated with the mobility measurement signal for inactive beam B3. The radio base station may identify beam B3 from the mobility measurement signal associated with this UL signal.

Note that, when using a UL grant-free UL signal, the beam ID and the RSRP/RSRQ of beam B3 may be included in this UL signal (for example, a UL data channel (PUSCH: Physical Uplink Shared Channel)).

(Recovery Operation)

Next, beam recovery operation based on the above-described recovery signal will be explained.

Figure 5:
FIG. 5 is a diagram to show an example of recovery operation according to the present embodiment.

FIG. 5 is a diagram to show an example of recovery operation according to the present embodiment. Note that, in FIG. 5, the radio base station learns, from the recovery signal from the user terminal, that the RSRP/RSRQ of the mobility measurement signal for beam B2 in FIG. 4 is better than the RSRP/RSRQ of the mobility measurement signal for beam B3.

Referring to FIG. 4, the radio base station (TRP) associates CSI-RS resources #1 to #4 with Tx beams B31 to B34 in beam B3 showing a better RSRP/RSRQ than beam B2, thereby reconfiguring the CSI-RS resources (reconfiguration) (step 301 in FIG. 5). Note that, in the state where the associations of beams B21 to B24 in beam B2 with the CSI-RS resources are maintained, Tx beams B31 to B34 in beam B3 may be newly associated with CSI-RS resources.

Information to represent the configuration of the reconfigured CSI-RS resources may be included in a response signal that is sent in response to the recovery signal (for example, a random access response (RAR) to a PRACH preamble), for example. Also, with this reconfiguration, the reporting contents (for example, the number of beams) to be associated with the trigger values for aperiodic CSI reporting may be changed. Furthermore, step S301 of FIG. 5 may be omitted.

The user terminal sends a beam report based on the measurement results of K reconfigured CSI-RS resources (step S302 of FIG. 5). To be more specific, the user terminal may transmit N CRIs, which correspond to N Tx beams, and at least one of the CQIs, RIs and PMIs of the N Tx beams specified by these N CRIs, to the radio base station.

The radio base station reconfigures the QCL between DMRS ports and CSI-RS resources based on the beam report from the user terminal (step S303 of FIG. 5). To be more specific, based on the measurement results of CSI-RS resources associated with Tx beams B31 to B34, the radio base station reconfigures the CSI-RS resources associated with each DMRS port, and reports the reconfigured CSI-RS resources to the user terminal (see FIG. 3). Information to show the QCL between DMRS ports and CSI-RS resources may be included in a response signal (for example, an RAR) to the recovery signal.

Figure 6:
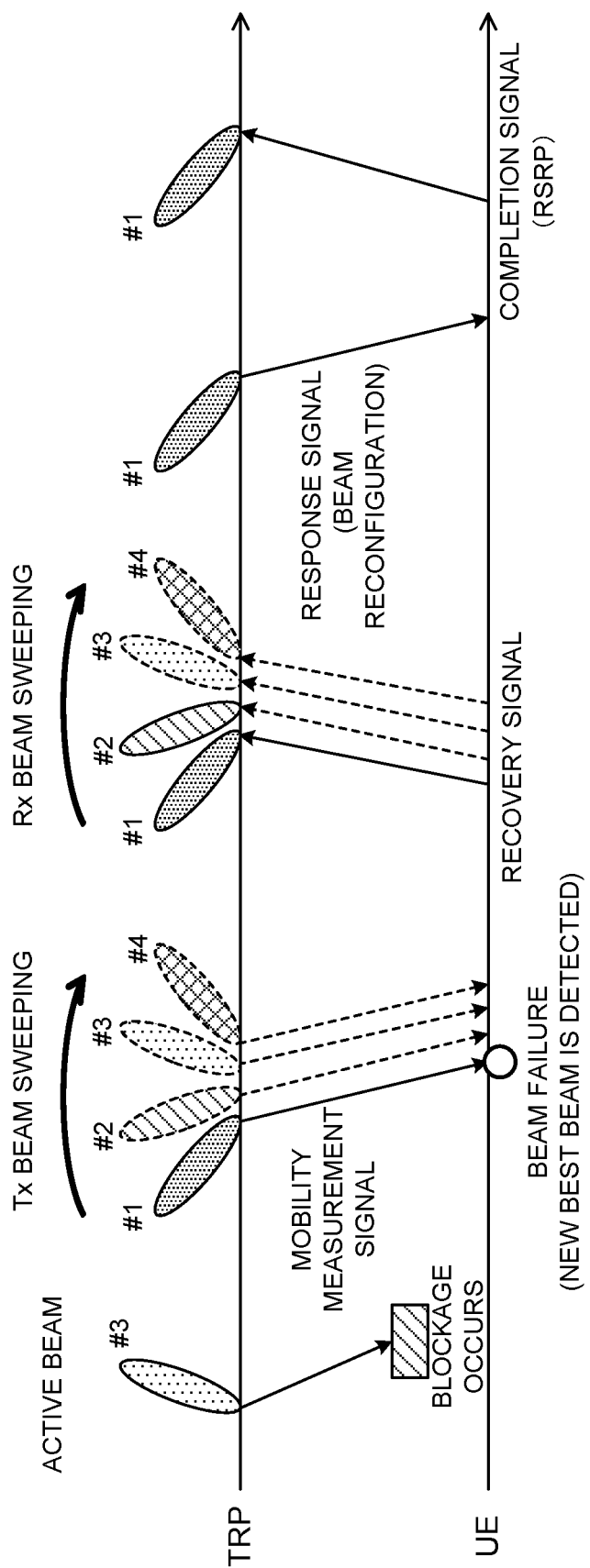
FIG. 6 is a diagram to show another example of recovery operation according to the present embodiment.

FIG. 6 is a diagram to show another example of recovery operation according to the present embodiment. Note that FIG. 6 assumes a case where Tx beam #3 is an active beam, and Tx beams #1, #2 and #4 are inactive beams.

In FIG. 6, the user terminal measures RSRP/RSRQ using mobility measurement signals (for example, SS blocks, MRSs or CSI-RSs) in a predetermined cycle. When the RSRP/RSRQ of active beam Tx beam #3 is lower than the RSRP/RSRQ of inactive beam Tx beam #1, the user terminal detects beam failure (the new best beam).

The user terminal transmits a recovery signal (for example, PRACH preamble, an SR or a UL grant-free UL signal). This recovery signal may be transmitted using a UL resource associated with the mobility measurement signal's resource (or an antenna port).

The radio base station transmits a response signal (for example, an RAR), in response to the recovery signal from the user terminal. To be more specific, based on the mobility measurement signal associated with the UL resource in which the recovery signal was transmitted, the radio base station may detect new best beam #1, and transmit the NR-PDCCH or the search space for the response signal using best beam #1. This search space is also referred to as "UE group search space" or "common search space." Furthermore, the Rx beam that is used to receive the NR-PDCCH or the search space may be the Rx beam used to receive the mobility measurement signal for best beam #1.

Based on the assumption that the NR-PDCCH or the search space for this response signal is transmitted using best beam #1, the user terminal may blind-decode the DCI communicated in this NR-PDCCH or search space, and receive the response signal based on the DCI. The response signal may be simply a response to receipt of the recovery signal, or may include information for triggering RSRP/RSRQ or CSI. Alternatively, this response signal may include, as beam reconfiguration information, information that shows the configurations of CSI-RS resources that have been reconfigured, information that shows the QCL between these CIS-RS resources and DMRS ports, and so forth.

Furthermore, in response to the response signal from the radio base station, the user terminal transmits a completion signal that indicates completion of beam reconfiguration. This completion signal may include RSRP. Furthermore, the radio base station may reconfigure the CSI-RS resources (and the QCL between the CSI-RS resources and DMRS ports) based on the RSRP included in the completion signal.

According to the recovery operation of the present embodiment, when the user terminal detects beam failure, user terminal-initiated recovery operation is started in response to a recovery signal from the user terminal, so that quick beam recovery is made possible.

(Radio Communication System)

Now, the structure of a radio communication system according to the present embodiment will be described below. In this radio communication system, communication is performed using one or a combination of the radio communication methods according to the herein-contained embodiments of the present invention.

Figure 7:
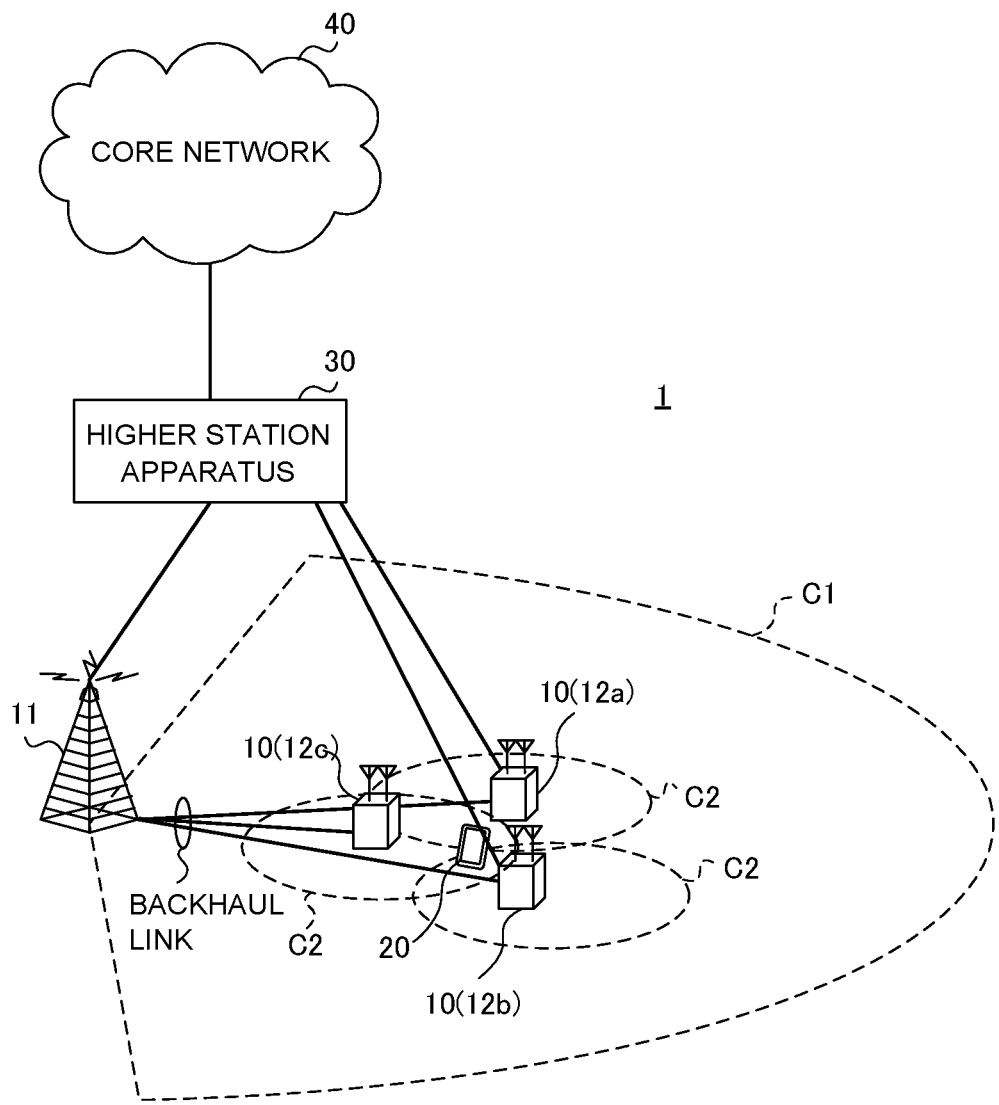
FIG. 7 is a diagram to show an example of a schematic structure of a radio communication system according to the present embodiment.

FIG. 7 is a diagram to show an example of a schematic structure of a radio communication system according to present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1 having a relatively wide coverage, and radio base stations 12 (12*a* to 12*c*) that are placed within the macro cell C1 and that form small cells C2, which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication is carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3 to 40 GHz) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs" (home eNodeBs), "RRHs" (Remote Radio Heads), "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and other radio access schemes may be used.

In the radio communication system 1, a DL data channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink (DL) channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH and used to communicate DCI and so on, like the PDCCH. The PDCCH and/or the EPDCCH are also referred to as "DL control channel," "NR-PDCCH," and the like.

In the radio communication system 1, an UL data channel (PUSCH (Physical Uplink Shared CHannel)), which is used by each user terminal 20 on a shared basis, an UL control channel (PUCCH (Physical Uplink Control CHannel)), a random access channel (PRACH (Physical Random Access CHannel)) and so on are used as uplink (UL) channels. User data and higher layer control information are communicated by the PUSCH. Also, downlink radio quality information (CQI: Channel Quality Indicator), delivery acknowledgement information and so on are communicated by the PUCCH. By means of the PRACH, random access preambles for establishing connections with cells are communicated.

In the radio communication systems 1, the cell-specific reference signal (CRS: Cell-specific Reference Signal), the channel state information reference signal (CSI-RS: Channel State Information-Reference Signal), the demodulation reference signal (DMRS: DeModulation Reference Signal), the positioning reference signal (PRS: Positioning Reference Signal), the mobility reference signal (MRS) and so on are communicated as downlink reference signals. Also, in the radio communication system 1, the measurement reference signal (SRS: Sounding Reference Signal), the demodulation reference signal (DMRS) and so on are communicated as UL reference signals. Note that the DMRS may be referred to as a "user terminal-specific reference signal (UE-specific Reference Signal)." Also, the reference signals to be communicated are by no means limited to these. In the radio communication system 1, synchronization signals (PSS and/or SSS), a broadcast channel (PBCH) and others are communicated in the downlink.

(Radio Base Station)

Figure 8:
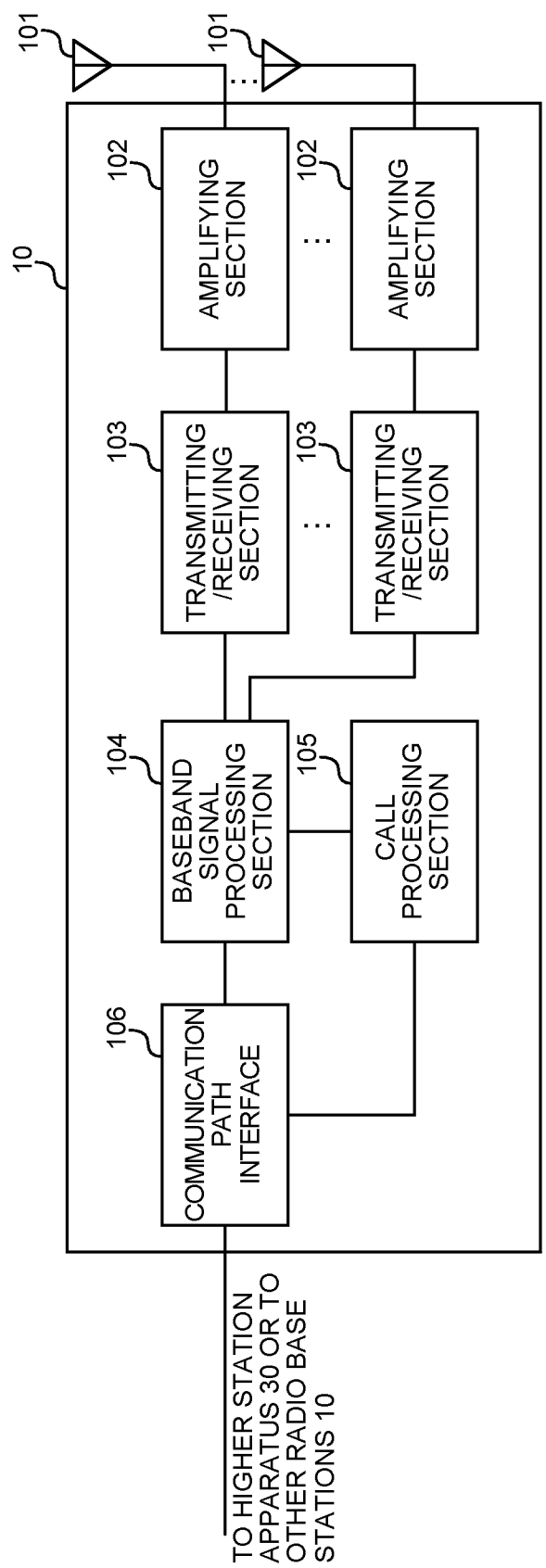
FIG. 8 is a diagram to show an example of an overall structure of a radio base station according to the present embodiment.

FIG. 8 is a diagram to show an example of an overall structure of a radio base station according to present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, DL control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, user data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 may furthermore have an analog beam forming section that forms analog beams. The analog beam forming section may be constituted by an analog beam forming circuit (for example, a phase shifter, a phase shifting circuit, etc.) or analog beam forming apparatus (for example, a phase shifting device) that can be described based on general understanding of the technical field to which the present invention pertains. Furthermore, the transmitting/receiving antennas 101 may be constituted by, for example, array antennas. In addition, the transmitting/receiving sections 103 are structured so that single-BF or multiple-BF operations can be used.

The transmitting/receiving sections 103 transmit DL signal (for example, at least one of the NR-PDCCH/PDSCH, mobility measurement signals, the CSI-RS, the DMRS, DCI, and DL data) and receive UL signals (for example, at least one of the PUCCH, the PUSCH, the recovery signal, measurement reporting, beam reporting, CSI reporting, UCI and UL data).

In addition, the transmitting/receiving sections 103 transmit at least one of information that represents the configurations of mobility measurement signals, information that represents the configurations of CSI-RS resources, information that represents associations between DMRS ports and CSI-RSs, and information that represents associations between mobility measurement signals (or the resources or antenna ports of mobility measurement signals) and UL resources for recovery signals.

Also, the transmitting/receiving sections 103 may receive a PRACH preamble and transmit a RAR. Also, the transmitting/receiving sections 103 may receive an SR. Also, the transmitting/receiving section 103 may receive UL signals transmitted from the radio base station 10 without DCI (UL grant).

Figure 9:
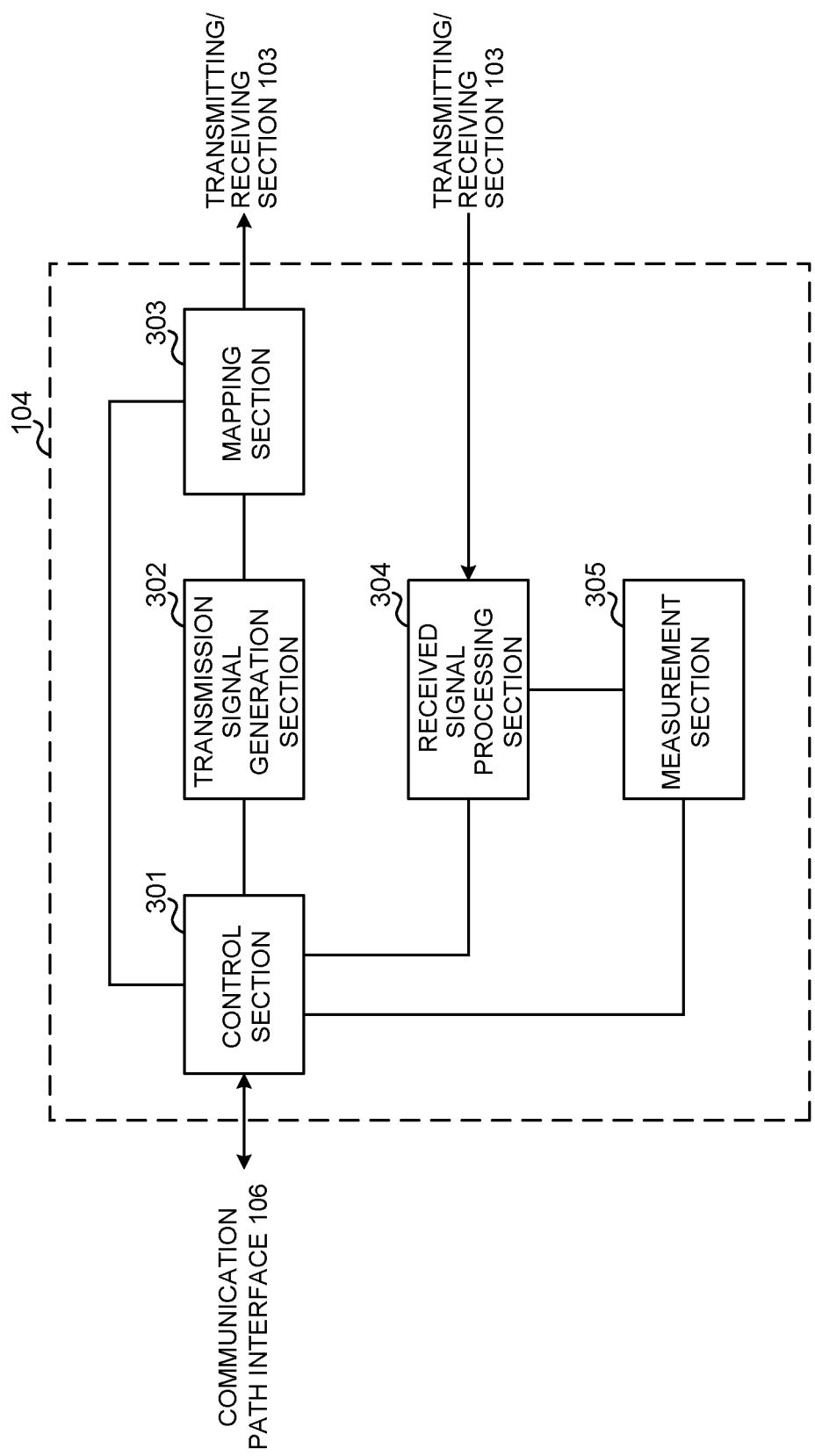
FIG. 9 is a diagram to show an example of a functional structure of a radio base station according to the present embodiment.

FIG. 9 is a diagram to show an example of a functional structure of a radio base station according to present embodiment. Note that, although this example primarily shows functional blocks that pertain to characteristic parts of present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls scheduling of DL data channels and UL data channels, and controls generation and transmission of DCI that schedules DL data channels (DL assignments) and DCI that schedules UL data channels (UL grants).

The control section 301 may exert control so that Tx beams and/or Rx beams are formed using digital BF (for example, precoding) by the baseband signal processing section 104 and/or analog BF (for example, phase rotation) by the transmitting/receiving sections 103.

The control section 301 controls the beams (Tx beams and/or Rx beams) that are used to transmit and/or receive DL signals (for example, the NR-PDCCH/PDSCH). To be more specific, the control section 301 may control these beams based on CSI (at least one of the CRI, the CQI, the PMI and the RI) from the user terminals 20.

The control section 301 may control the beams that are used to transmit and/or receive mobility measurement signals. The control section 301 may also control the beams to be used to transmit and/or receive CSI-RSs.

Furthermore, the control section 301 may control the beam recovery (switching) based on a recovery signal from the user terminal 20. To be more specific, the control section 301 may identify the best beam of the user terminal 20 based on the recovery signal, and control reconfiguration of CSI-RS resources, reconfiguration of QCL between DMRS ports and CSI-RS resources and so on.

Furthermore, the control section 301 may exert control so that information to represent the configurations of CSI-RS resources that have been reconfigured, and/or information to represent the QCL between DMRS ports and CSI-RS resources are included in a response signal to the recovery signal, and transmitted.

Furthermore, the control section 301 may control associations between mobility measurement signals (or the mobility measurement signals' resources or antenna ports) and UL resources for recovery signals, and control transmission of information showing these associations.

The transmission signal generation section 302 generates DL signals based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

The transmission signal generation section 302 generates DCI (DL assignment, UL grant, etc.) based on commands from the control section 301, for example. Furthermore, a DL data channel (PDSCH) is subjected to an encoding process, a modulation process, a beam forming process (precoding process), based on coding rates, modulation schemes and others, which are determined based on, for example, CSI from each user terminal 20.

The mapping section 303 maps the DL signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, UL signals transmitted from the user terminals 20. For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when feedback information (for example, CSI, HARQ-ACK, etc.) arrives from the user terminal, this feedback information is output to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

When signals are received, the measurement section 305 may measure, for example, the received power (for example, RSRP (Reference Signal Received Power)), the received quality (for example, RSRQ (Reference Signal Received Quality)), SINR (Signal to Interference plus Noise Ratio), channel states and so on. The measurement results may be output to the control section 301.

(User Terminal)

Figure 10:
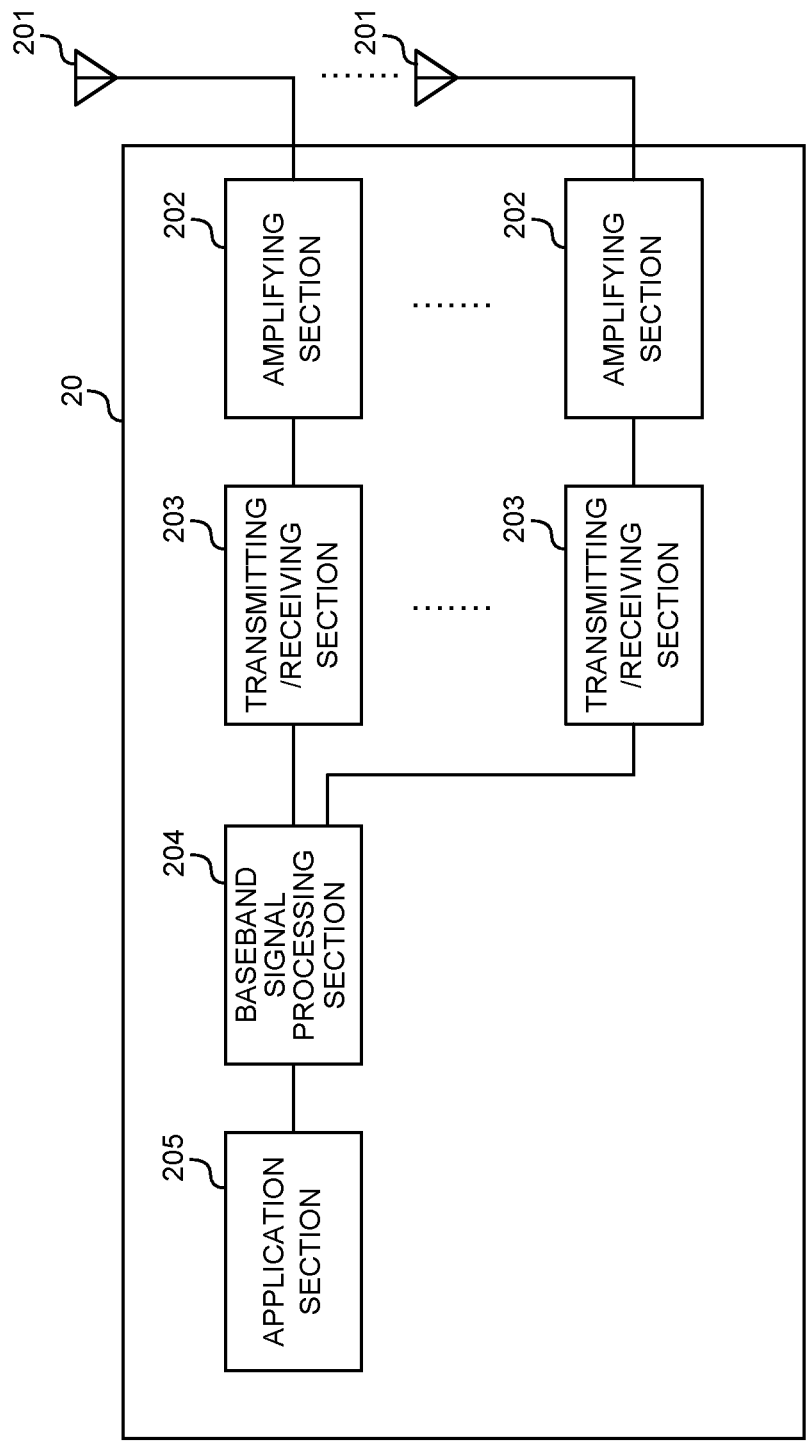
FIG. 10 is a diagram to show an example of an overall structure of a user terminal according to the present embodiment.

FIG. 10 is a diagram to show an example of an overall structure of a user terminal according to the present embodiment. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the DL signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process and so on. Downlink user data is forwarded to the application section 205. The application section 205 performs processes related to higher layers above the physical layer and the MAC layer and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may furthermore have an analog beam forming section that forms analog beams. The analog beam forming section may be constituted by an analog beam forming circuit (for example, a phase shifter, a phase shifting circuit, etc.) or analog beam forming apparatus (for example, a phase shifting device) that can be described based on general understanding of the technical field to which the present invention pertains. Furthermore, the transmitting/receiving antennas 201 may be constituted by, for example, array antennas. In addition, the transmitting/receiving sections 203 are structured so as to be capable of single-BF and multiple-BF operations.

The transmitting/receiving sections 203 receive DL signals (for example, at least one of the NR-PDCCH/PDSCH, mobility measurement signals, the CSI-RS, the DMRS, DCI and DL data) and transmit UL signals (for example, at least one of the PUCCH, the PUSCH, the recovery signal, measurement reporting, beam reporting, CSI reporting, UCI and UL data).

In addition, the transmitting/receiving sections 203 receive at least one of information that represents the configurations of mobility measurement signals, information that represents the configurations of CSI-RS resources, information that represents associations between DMRS ports and CSI-RSs, and information that represents associations between mobility measurement signals (or the resources or antenna ports of mobility measurement signals) and UL resources for recovery signals.

In addition, the transmitting/receiving sections 203 may transmit a PRACH preamble and receive a RAR. Also, the transmitting/receiving sections 203 may transmit an SR. In addition, the transmitting/receiving sections 203 may transmit UL signals without DCI (UL grants) from the radio base station 10.

Figure 11:
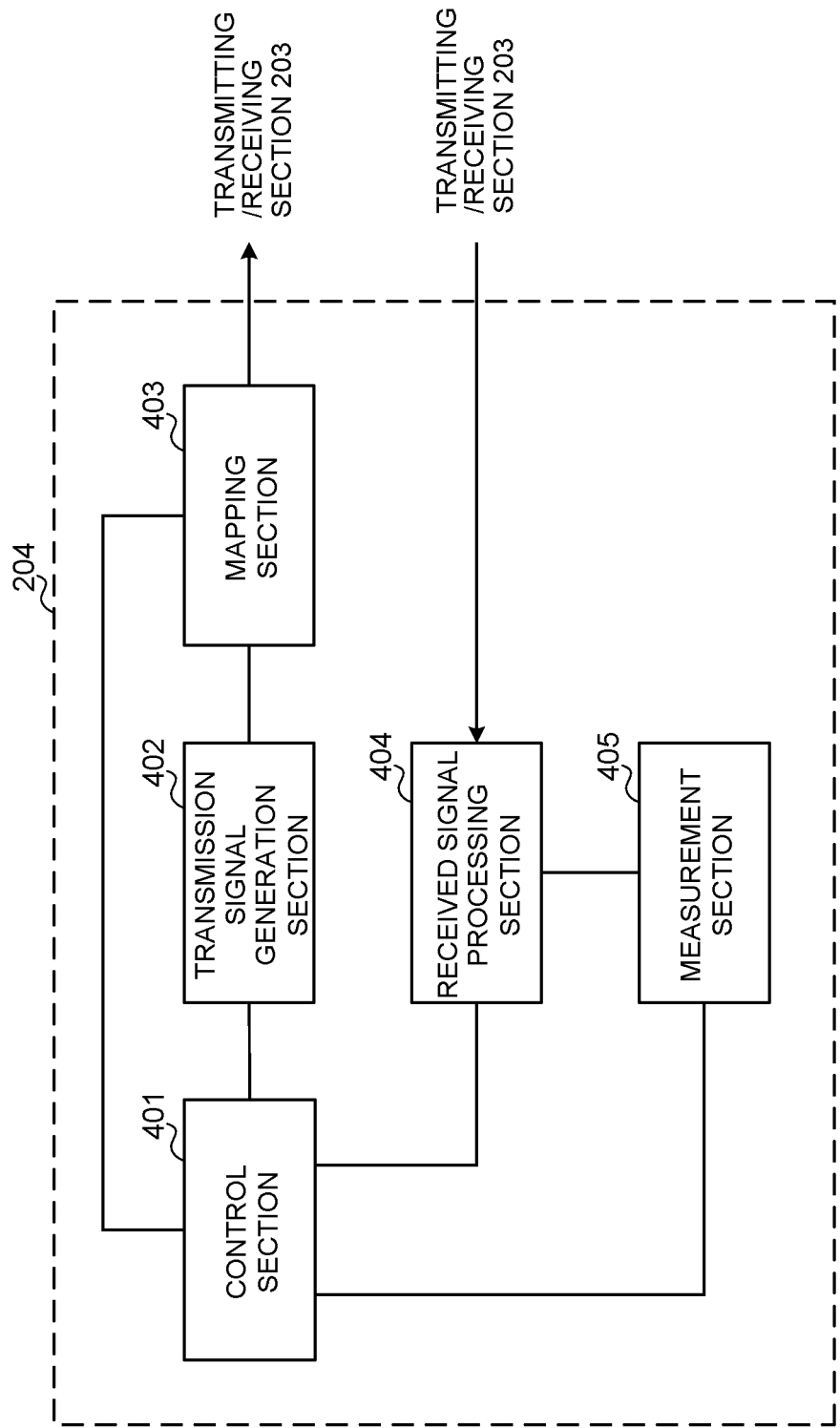
FIG. 11 is a diagram to show an example of a functional structure of a user terminal according to the present embodiment.

FIG. 11 is a diagram to show an example of a functional structure of a user terminal according to present embodiment. Note that, although this example primarily shows functional blocks that pertain to characteristic parts of present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires DL control signals (DL control channels) and DL data signals (DL data channels) transmitted from the radio base station 10 from the received signal processing section 404. The control section 401 controls generation of UL control signals (for example, delivery acknowledgement information and so on) and/or UL data signals based on whether or not retransmission control is necessary, which is decided in response to DL control signals, DL data signals and so on.

The control section 401 may exert control so that transmitting beams and/or receiving beams are formed using the digital BF (for example, precoding) by the baseband signal processing section 204 and/or the analog BF (for example, phase rotation) by the transmitting/receiving sections 203.

The control section 401 controls the beams (Tx beams and/or Rx beams) that are used to transmit and/or receive DL signals (for example, the NR-PDCCH/PDSCH).

To be more specific, the control section 401 controls transmission of the recovery signal (UL signal) that request switching of the above beams, based on the received power and/or the received quality of a plurality of mobility measurement signals that are respectively associated with a plurality of beams. This recovery signal may be one of the PRACH preamble, an SR and a UL grant-free UL signal. The UL grant-free UL signal may be transmitted in a predetermined UL resource.

Furthermore, the control section 401 may exert control so that the recovery signal is transmitted using a UL resource that is associated with the mobility measurement signal of the best RSRP/RSRQ.

In addition, the control section 401 controls transmission of measurement reports based on RRM measurement results, which have been measured using mobility measurement signals. A measurement report here may include at least one of the beam ID and the RSRP/RSRQ of a beam whose RSRP/RSRQ fulfills a predetermined condition.

Also, based on information indicating the configurations of CSI-RS resources from the radio base station 10, the control section 401 may control the CSI-RS resource measurements by the measurement section 405. Furthermore the control section 401 may control generation and/or reporting of CSI based on beam measurement results (CSI measurement results), which have been measured using CSI-RS resources. At least one of CRI, CQI, PMI and RI may be included in CSI.

Furthermore, the control section 401 may control the receiving process (demodulation and/or decoding) of DL signals based on information representing QCL between DMRS ports and CSI-RS resources, provided from the radio base station 10. To be more specific, the control section 401 may assume that the same beams as CSI-RS resources associated with DMRS ports are used to transmit and/or receive DL signals.

Furthermore, the control section 401 may control the receiving process (demodulation and/or decoding) of a response signal to the recovery signal. To be more specific, the control section 401 may assume that the beam that is used to transmit and/or receive this response signal (and/or the NR-PDCCH or the search space for scheduling the response signal) is used to transmit and/or receive the mobility measurement reference signal with the best RSRP/RSRQ.

The transmission signal generation section 402 generates UL signals (UL control signals, UL data signals, UL reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

The transmission signal generation section 402 generates feedback information (for example, at least one of an HARQ-ACK, CSI and a scheduling request) based on, for example, a command from the control section 401. Also, the transmission signal generation section 402 generates uplink data signals based on commands from the control section 401. For example, when a UL grant is included in a DL control signal that is reported from the radio base station 10, the control section 401 commands the transmission signal generation section 402 to generate an uplink data signal.

The mapping section 403 maps the UL signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, DL signals (DL control signals, DL data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals, the signals after the receiving processes and so on, to the measurement section 405.

The measurement section 405 conducts measurements with respect to the received signals. For example, the measurement section 405 performs measurements using mobility measurement signals and/or CSI-RS resources transmitted from the radio base station 10. The measurement section 405 can be constituted by a measurer, a measurement circuit or measurement apparatus that can be described based on general understanding of the technical field to which the present invention pertains.

The measurement section 405 may measure, for example, the received power (for example, RSRP), the received quality (for example, RSRQ, reception SINR), the channel states and so on of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 12:
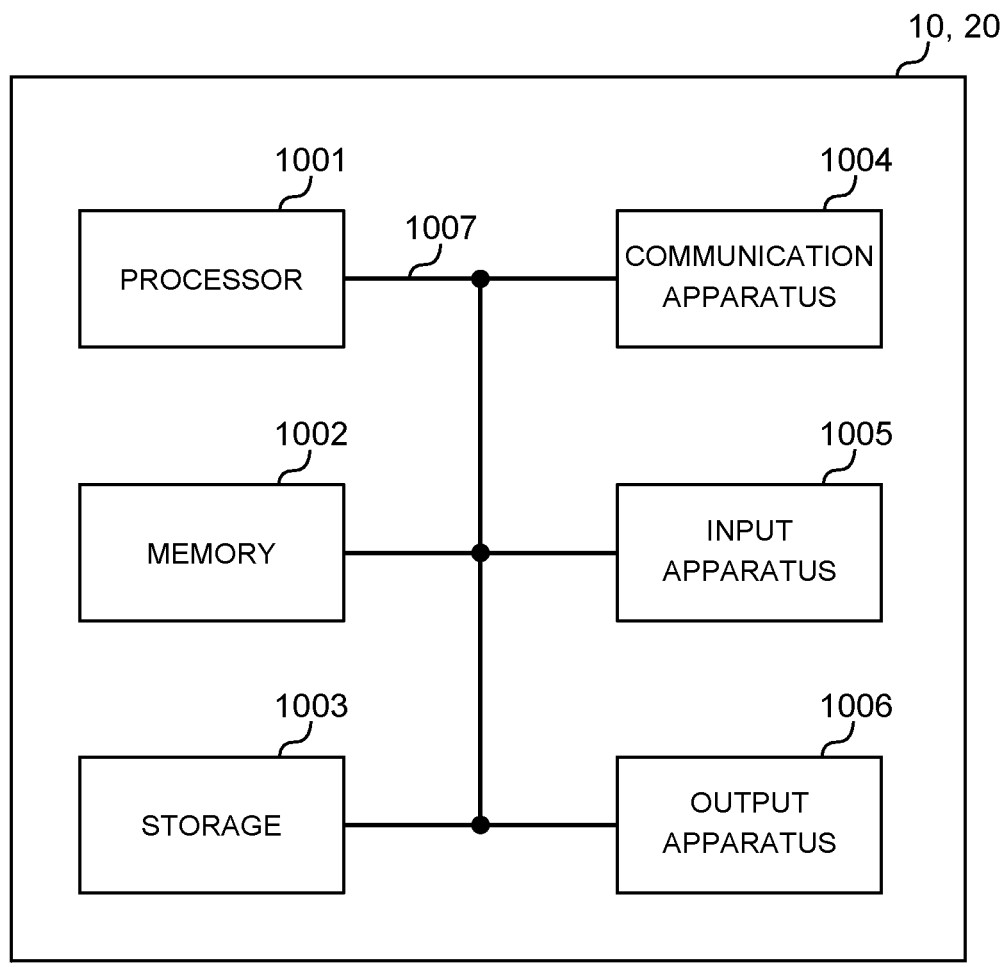
FIG. 12 is a diagram to show an example hardware structure of a radio base station and a user terminal according to the present embodiment.

For example, the radio base station, user terminals and so on according to embodiments of the present invention may function as a computer that executes the processes of the radio communication method of the present invention. FIG. 12 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, 1 ms) not dependent on the neurology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on neurology. Also, a slot may include a plurality of minislots. Each minislot may consist of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, one subframe may be referred to as a "transmission time interval" (TTI), or a plurality of consecutive subframes may be referred to as a "TTI," or one slot or minislot may be referred to as a "TTI." That is, a subframe and/or a TTI may be a subframe (1 ms) in existing LTE, may be a shorter period than 1 ms (for example, one to thirteen symbols), or may be a longer period of time than 1 ms. Note that the unit to represent the TTI may be referred to as a "slot," a "minislot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the time interval (for example, the number of symbols) in which transport blocks, code blocks and/or codewords are actually mapped may be shorter than the TTI.

Note that, when one slot or one minislot is referred to as a "TTI," one or more TTIs (that is, one or more slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," "a partial TTI (or a "fractional TTI")," a "shortened subframe," a "short subframe," a "minislot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB: Physical RB)," a "subcarrier group (SCG)," a "resource element group (REG)," a "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, minislots, symbols and so on described above are merely examples. For example, configurations pertaining to the number of subframes included in a radio frame, the number of slots included in a subframe, the number of minislots included in a slot, the number of symbols and RBs included in a slot or a minislot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information" (L1/L2 control signals), "L1 control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)," "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

Note that the radio communication system 1 may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Global System for Mobile communications) (registered trademark), CDMA 2000, UMB (Ultra Mobile Broadband), IEEE 802.11 (Wi-Fi (registered trademark)), IEEE 802.16 (WiMAX(registered trademark)), IEEE 802.20, WB (Ultra-WideBand), Bluetooth (registered trademark) and other appropriate radio communication technologies, and/or may be applied to next-generation systems that are enhanced base on these radio communication technologies.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2017-018950, filed on Feb. 3, 2017, including the specification, drawings and abstract, is incorporated herein by reference in its entirety.

The invention claimed is:

1. A terminal comprising:
a processor that detects a beam failure based on reception power of a synchronization block (SSB); and
a transmitter that transmits an uplink (UL) signal that requires beam recovery in response to detection of the beam failure,
wherein the transmitter transmits the UL signal using a UL resource having an association with an SSB of a candidate beam,
wherein the processor controls reception of a response signal to the UL signal based on the SSB of the candidate beam, and
wherein information representing the association between the UL resource and the SSB of the candidate beam is signaled by higher layer signaling.

2. The terminal according to claim 1, wherein the processor blind decodes a downlink control channel for the response signal to the UL signal in a search space.

3. The terminal according to claim 1, wherein the UL signal is a physical random access channel (PRACH) preamble.

4. A radio communication method for a terminal, comprising:

detecting a beam failure based on reception power of a synchronization block (SSB); and transmitting an uplink (UL) signal that requires beam recovery in response to detection of the beam failure, wherein the UL signal is transmitted using a UL resource having an association with an SSB of a candidate beam, wherein the terminal controls reception of a response signal to the UL signal based on the SSB of the candidate beam, and wherein information representing the association between the UL resource and the SSB of the candidate beam is signaled by higher layer signaling.

5. The terminal according to claim 2, wherein the UL signal is a physical random access channel (PRACH) preamble.

6. A base station comprising:

a transmitter that transmits a synchronization block (SSB); and a processor that controls reception of an uplink (UL) signal that requires beam recovery from a terminal which detects a beam failure based on reception power of the SSB, wherein the UL signal is received using a UL resource having an association with an SSB of a candidate beam, wherein the transmitter transmits a response signal to the UL signal based on the SSB of the candidate beam, and wherein information representing the association between the UL resource and the SSB of the candidate beam is signaled by higher layer signaling.

7. A radio communication system comprising a terminal and a base station, wherein:

the terminal comprises:

a first processor that detects a beam failure based on reception power of a synchronization block (SSB); and a first transmitter that transmits an uplink (UL) signal that requires beam recovery in response to detection of the beam failure, wherein the first transmitter transmits the UL signal using a UL resource having an association with an SSB of a candidate beam, wherein the first processor controls reception of a response signal to the UL signal based on the SSB of the candidate beam, and wherein information representing the association between the UL resource and the SSB of the candidate beam is signaled by higher layer signaling, and the base station comprises;

a second transmitter that transmits the SSB; and a second processor that controls reception of the UL signal that requires beam recovery from the terminal, wherein the UL signal is received using the UL resource having the association with the SSB of the candidate beam, and wherein the second transmitter transmits the response signal to the UL signal based on the SSB of the candidate beam.

* * * * *